V. A. FYNN.
POWER TRANSMITTING APPARATUS.
APPLICATION FILED MAY 9, 1916.

1,361,244.

Patented Dec. 7, 1920.

INVENTOR.
Valère A. Fynn
BY
E. E. Huffman
ATTORNEY

UNITED STATES PATENT OFFICE.

VALÈRE A. FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

POWER-TRANSMITTING APPARATUS.

1,361,244.     Specification of Letters Patent.     Patented Dec. 7, 1920.

Application filed May 9, 1916. Serial No. 96,287.

*To all whom it may concern:*

Be it known that I, VALÈRE A. FYNN, a subject of the King of England, residing at the city of St. Louis, State of Missouri, United States of America, have invented a certain new and useful Power-Transmitting Apparatus, of which the following is such a full, clear, and exact description as will enable any one skilled in the art to which it appertains to make and use the same, reference being had to the accompanying drawings, forming part of this specification.

My invention relates to the transmission of power and the control thereof, more particularly in connection with self-propelled vehicles in which the prime mover is an internal combustion engine.

Because the torque of an internal combustion engine is very small at low speeds, reaches a maximum with increasing speed, and then diminishes again, it has been found necessary to change the gear ratio between the engine and the vehicle wheels, in order to start such vehicles and to drive them over heavy roads or up steep grades. This change is usually carried out by means of a hand-operated gear shifting lever. In order to dispense with this lever and gearing and the disadvantages connected therewith, and in order, also, to increase the number of available transmission ratios between engine and wheels, the substitution of electromagnetic variable ratio transmission apparatus for the mechanical gearing has heretofore been proposed.

My invention relates to improvements in such electromagnetic transmission apparatus, and has for its object to make the necessary changes in transmission ratio very gradual and entirely automatic, over a wide range, thus reducing the necessary manipulation of the electrical circuits by the operator to a minimum.

Figure 1:
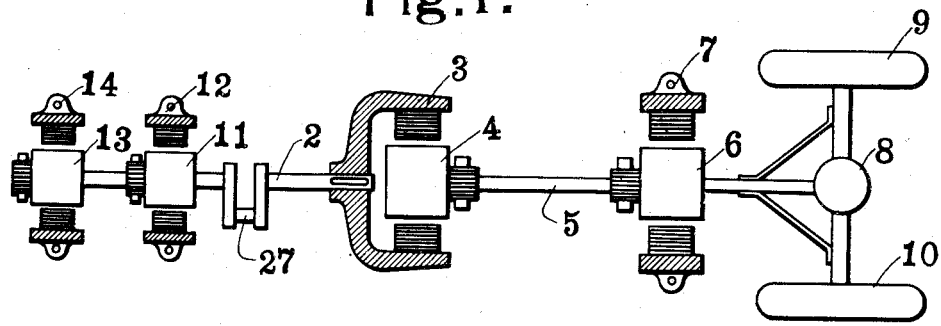
Figure 2:
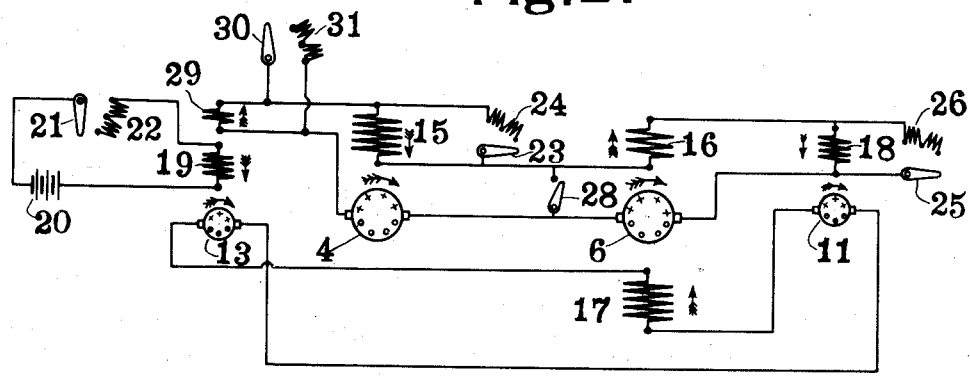

Referring to the accompanying drawing, Figure 1 is a diagrammatic representation of a possible mechanical disposition of the several parts of my apparatus, whereas Fig. 2 shows the arrangement of electrical circuits in one embodiment of my invention.

Referring to the drawings, I will describe my invention as applied to a motor car driven by an internal combustion engine having a shaft 2. The location of this engine is indicated by the crank 27, but it will be understood that said engine will preferably have more than one cylinder. This shaft 2 is connected to and drives the field structure 3 of a dynamo electric machine, the armature 4 of which is connected to the driven shaft 5. This shaft drives the vehicle wheels 9, 10, through the differential 8. Coupled to this same shaft is the armature 6 of another dynamo electric machine, the field structure 7 of which is attached to the frame of the vehicle and is stationary with respect to the shaft 5. This part of the mechanical features embodied in my invention is well understood, and it is usual to refer to the dynamo electric machine 3, 4, as a generator, and to the dynamo electric machine 7, 6, as a motor. The engine shaft 2 also drives the armature 11 of an exciting dynamo and the armature 13 of an auxiliary dynamo. The field structures, 12 and 14, of these dynamos are stationary.

Referring to Fig. 2, the armature 4 of the generator is connected in series with a field winding 29 of the auxiliary dynamo, and the field winding 15 of the generator, and is further connected in series with the field winding 16 of the motor, the field winding 18 of the regulating dynamo 11, and in series with the motor armature 6. The field structure 7 of the motor also carries a regulating field winding 17 connected in circuit with the armature 11 of the exciting dynamo and with the armature 13 of the auxiliary dynamo. The field structure 14 of the auxiliary dynamo also carries an exciting winding 19 energized from the storage battery 20 and controlled by means of the switch 21 and the resistance 22 with which it coöperates. The other exciting winding 29 of the auxiliary dynamo can be regulated by means of the resistance 31 and the switch 30 coöperating therewith. The field winding of the series generator 3, 4 is adapted to be regulated by means of the resistance 24 and the switch 23 coöperating therewith. The generator 3, 4 as a whole is adapted to be short circuited by the switch 28, and the resistance 26 coöperating with the switch 25 is connected in parallel with the field winding 18 of the exciting dynamo, and is adapted to vary the excitation of said machine.

I may or may not make use of the motor field winding 16. If used, this winding may be connected to magnetize in the same direction as the regulating field winding 17 of the motor when the apparatus is developing its maximum torque, or it may be connected in the opposite direction.

In describing the operation of my apparatus I will first assume that the winding 16 on the motor field structure 7 and the field winding 29 of the auxiliary dynamo are not made use of. Under these conditions, and with the prime mover at rest, the field winding of the exciting dynamo may be short circuited by means of the switch 25; the field circuit of the auxiliary dynamo may be open at the switch 21, and switch 28 may be open, but switch 23 should place the resistance 24 in shunt with the generator field winding 15. The engine can now be started in any convenient manner. When it revolves, it will cause the field structure 3 of the generator to revolve with it, and said generator will become excited, sending a current through the armature 6 of the motor and transmitting a certain amount of torque to the driven shaft 5. This torque will be entirely due to the interaction between the armature 4 and the field structure 3, since the motor is not excited and cannot exert any effort on the shaft 5. In order to render the motor active, it is necessary to excite the field of the exciting dynamo, and, in order to secure the desired regulation it is necessary to excite the field of the auxiliary dynamo. This is accomplished by closing switch 21 and opening switch 25. The direction in which their fields are excited are so chosen in relation to the direction of rotation of the armatures 11 and 13, that the E. M. F.'s due to these two machines oppose each other. The normal excitations of these machines, occurring with all of the resistance 22 cut out of the circuit of the winding 19 and with switch 25 open, are so selected that when the vehicle wheels are locked and the apparatus is exerting its maximum torque, the voltage generated in the armature 11 will exceed that generated in the armature 13, and the direction of the current through the regulating field winding 17 of the motor will be determined by the voltage of the armature 11. In order to secure the maximum torque of the combination, switch 23 should be open. If this maximum torque is sufficient to start the vehicle, then as the speed thereof increases, the current in the armature circuit of the generator and motor will diminish, thus reducing the excitation of the regulating dynamo and consequently reducting the current in the regulating field winding 17 of the motor. This change will reduce the torque exerted on the driven shaft 5, but it will increase its speed. According to the relative magnitude given to the excitations of the exciting and auxiliary dynamos, the maximum speed at which this apparatus will drive the driven shaft will either exceed, equal, or be less than that of the driving shaft. If the excitations are so chosen that the maximum speed of the driven shaft is less than that of the driving shaft, then the current in the regulating field winding 17 will simply vary between certain values. If the maximum speed of the driven shaft nearly equals that of the driving shaft, then the current in 17 will vary from a maximum to practically zero. When the excitations are chosen to produce a supersynchronous speed of the driven shaft 5, that is a speed in excess of the speed of the driving shaft 2, then the current in the regulating winding 17 will fall from a maximum to zero, and will then reverse. The relative magnitude of these excitations can be varied by means of the switches 21 and 25, and the automatic characteristics of this apparatus can in this way be changed. A certain amount of regulation can also be obtained by placing in shunt with the generator field winding 15 more or less of the resistance 24.

The operation of this mechanism is only altered in degree in case a motor field winding such as 16 is made use of. The introduction of such a winding for a given excitation of the auxiliary and exciting dynamos will merely change the maximum speed of the driven shaft. If 16 is made to magnetize in the same direction as 17, for maximum torque conditions, then the maximum speed of the driven shaft will be lowered. If it is made to magnetize in an opposite direction, the maximum speed of the driven shaft will be raised.

By making use of the exciting winding 29 on the auxiliary dynamo, connecting same in series with the generator, and so as to oppose the magnetization produced by the exciting winding 19 it is possible to reduce the size of the exciting dynamo and to increase the range of regulation of the apparatus. The addition of the exciting winding 29 causes the voltage of the auxiliary dynamo to decrease with increasing voltage of the exciting dynamo and vice versa. With the exciting winding 29 in use, maximum torque conditions, in other words maximum motor excitation, can be provided with less voltage at the terminals of the exciting dynamo, because at such time the opposing voltage of the auxiliary dynamo will be reduced by the action of the winding 29.

When it is desired to dispense with the automatic features of this power transmitting mechanism, it is only necessary to short circuit the field winding of the regulating dynamo by means of switch 25 and to reduce the excitation of the auxiliary dynamo to zero by opening switch 21 and short circuiting the winding 29 if used. When this automatic feature has been eliminated, then power can still be transmitted from the engine to the wheels by means of the generator 3, 4, and in case a field winding, such as 16, is made use of, also by means of the motor 6, 7. When the motor is not excited, that is when the winding 16 is not made use of, then the speed of the driven shaft will be nearly the same as that of the driving shaft, and the inclusion of the armature 6 in the generator circuit merely results in a waste of energy. It is then preferable to close switch 28, thus reducing the resistance in circuit with the generator 3, 4, and causing the latter to operate at a higher efficiency and smaller slip. When the field winding 16 is made use of, as shown, then the motor is operative, adds to the torque transmitted to the driven shaft, and lowers the speed thereof. It can, however, at any time be eliminated and the speed raised to near synchronism by closing switch 28. The energy transmitted from the shaft 2 to the shaft 5 can be regulated to a certain degree even when the generator alone is effective, simply by manipulating switch 23 and shunting the excitation of said generator more or less.

When applying the brake under ordinary operating conditions, with the car in motion, it is advisable in order to avoid a possible stalling of the engine, to render the power transmitting mechanism ineffective. This can be done by rendering the regulating circuit and the main circuit inoperative. The regulating circuit can be rendered inoperative either by interrupting same or by deënergizing the exciting and regulating dynamos. The exciting dynamo can be deënergized by short circuiting its exciting winding 18. The auxiliary dynamo can be deënergized by opening switch 21 and short circuiting the winding 29. The main circuit can be rendered ineffective either by interrupting same or, more simply, by short circuiting the series field winding 15 of the generator by means of the switch 23.

Having fully described my invention, what I claim as new and desire to secure by Letters Patent of the United States is:

1. In an apparatus of the character described, the combination of a prime mover, a driven shaft, a generator having one element driven by the prime mover and the other connected to the driven shaft, a motor connected to receive electrical energy from the generator and having one element connected to the driven shaft, an exciting winding for the motor, two sources of E. M. F. connected in circuit with said exciting winding, and means causing the E. M. F. from one of said sources to vary with the speed of the prime mover.

2. In an apparatus of the character described, the combination of a prime mover, a driven shaft, a generator having one element driven by the prime mover and the other connected to the driven shaft, a motor connected to receive electrical energy from the generator and having one element connected to the driven shaft, an exciting winding for the motor, two sources of E. M. F. connected in opposition and in circuit with said exciting winding, and means for causing the magnitude of one of these E. M. F.'s to vary with the generator current.

3. In an apparatus of the character described, the combination of a prime mover, a driven shaft, a generator having one element driven by the prime mover and the other connected to the driven shaft, a motor connected to receive electrical energy from the generator and having one element connected to the driven shaft, an exciting winding for the motor, an exciting dynamo, and an auxiliary dynamo, both of said dynamos being in circuit with said exciting winding.

4. In an apparatus of the character described, the combination of a prime mover, a driven shaft, a generator having one element driven by the prime mover and the other connected to the driven shaft, a motor connected to receive electrical energy from the generator and having one element connected to the driven shaft, an exciting winding for the motor, an exciting dynamo, and an auxiliary dynamo, both dynamos being in circuit with said exciting winding and the auxiliary dynamo being provided with a field winding in circuit with the generator.

5. In an apparatus of the character described, the combination of a prime mover, a driven shaft, a generator having one element driven by the prime mover and the other connected to the driven shaft, a motor connected to receive electrical energy from the generator and having one element connected to the driven shaft, an exciting winding for the motor, an exciting dynamo, and an auxiliary dynamo, both of said dynamos being driven by the prime mover and connected in circuit with said exciting winding.

6. In an apparatus of the character described, the combination of a prime mover, a driven shaft, a generator having one element driven by the prime mover and the other connected to the driven shaft, a motor connected to receive electrical energy from the generator and having one element connected to the driven shaft, an exciting winding for the motor, an exciting dynamo and an additional source of E. M. F. connected to oppose the E. M. F. generated by the exciting dynamo, said motor exciting winding, the additional source of E. M. F. and the exciting dynamo being connected in series circuit.

7. In an apparatus of the character described, the combination of a prime mover, a driven shaft, a generator having one element driven by the prime mover and the other connected to the driven shaft, a motor connected to receive electrical energy from the generator and having one element connected to the driven shaft, an exciting winding for the motor, an exciting dynamo and an auxiliary dynamo, said dynamos being adapted to generate opposing E. M. F.'s and both connected in series circuit and with said exciting winding.

8. In an apparatus of the character described, the combination of a prime mover, a driven shaft, a generator having one element driven by the prime mover and the other connected to the driven shaft, a motor connected to receive electrical energy from the generator and having one element connected to the driven shaft, an exciting winding for the motor, an exciting dynamo having its field winding in circuit with the generator, an auxiliary dynamo, and a source of constant exciting E. M. F. therefor, said auxiliary dynamo being adapted to generate an E. M. F. opposing the E. M. F. generated by the exciting dynamo, said exciting dynamo, auxiliary dynamo and motor exciting winding being connected in series circuit.

9. In an apparatus of the character described, the combination of a prime mover, a driven shaft, a series generator having one element driven by the prime mover and the other connected to the driven shaft, a motor having its armature connected in series with the generator and having one of its elements connected to the driven shaft, an exciting winding for the motor and an exciting dynamo for supplying current to said motor exciting winding, said exciting dynamo being driven by the prime mover and having its field winding in circuit with the generator.

10. In an apparatus of the character described, the combination of a prime mover, a driven shaft, a series generator having one element driven by the prime mover and the other connected to the driven shaft, a motor having its armature connected in series with the generator and having one of its elements connected to the driven shaft, an exciting winding for the motor, an exciting dynamo for supplying current to said motor exciting winding, and an auxiliary dynamo connected in series and to oppose the E. M. F. generated by the exciting dynamo.

11. In an apparatus of the character described, the combination of a prime mover, a driven shaft, a series generator having one element driven by the prime mover and the other connected to the driven shaft, a motor having its armature connected in series with the generator and having one of its elements connected to the driven shaft, an exciting winding for the motor, an exciting dynamo for supplying current to said motor exciting winding, an auxiliary dynamo connected in series and to oppose the E. M. F. generated by the exciting dynamo, and a source of constant exciting E. M. F. for said auxiliary dynamo.

12. In an apparatus of the character described, the combination of a prime mover, a driven shaft, a series generator having one element driven by the prime mover and the other connected to the driven shaft, a motor having its armature connected in series with the generator and having one of its elements connected to the driven shaft, an exciting winding for the motor, an exciting dynamo for supplying current to said motor exciting winding, an auxiliary dynamo connected in series and to oppose the E. M. F. generated by the exciting dynamo, said exciting and auxiliary dynamos being driven by the prime mover, and a source of constant exciting E. M. F. for said auxiliary dynamo.

13. In an apparatus of the character described, the combination of a prime mover, a driven shaft, a generator having one element driven by the prime mover and the other connected to the driven shaft, a motor connected to receive electrical energy from the generator and having one element connected to the driven shaft, an exciting winding for the motor, an auxiliary dynamo in circuit with said winding, and a source of constant E. M. F., said auxiliary dynamo having two field windings, one of said windings being in circuit with the generator and the other in circuit with the source of constant E. M. F.

In testimony whereof I have hereunto set my hand and affixed my seal.

VALÈRE A. FYNN. [L. S.]